G. H. ZANE.
Potato-Dropper.

No. 168,702.

Patented Oct. 11, 1875.

Witnesses:
L. F. Brous
A. P. Grant

Inventor:
Geo. H. Zane,
by John A. Wiedersheim
Atty.

2 Sheets--Sheet 2.

G. H. ZANE.
Potato-Dropper.

No. 168,702.

Patented Oct. 11, 1875.

Witnesses:
L. F. Brous
A. P. Grant

Inventor:
Geo. H. Zane.
by John A. Wiedersheim
Atty.

N. PETERS, PHOTO-LITHOGRAPHER, WASHINGTON, D. C.

UNITED STATES PATENT OFFICE.

GEORGE H. ZANE, OF SHOEMAKERTOWN, PENNSYLVANIA.

IMPROVEMENT IN POTATO-DROPPERS.

Specification forming part of Letters Patent No. 168,702, dated October 11, 1875; application filed January 23, 1875.

*To all whom it may concern:*

Be it known that I, GEORGE H. ZANE, of Shoemakertown, in the county of Montgomery and State of Pennsylvania, have invented a new and useful Improvement in Potato-Droppers; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
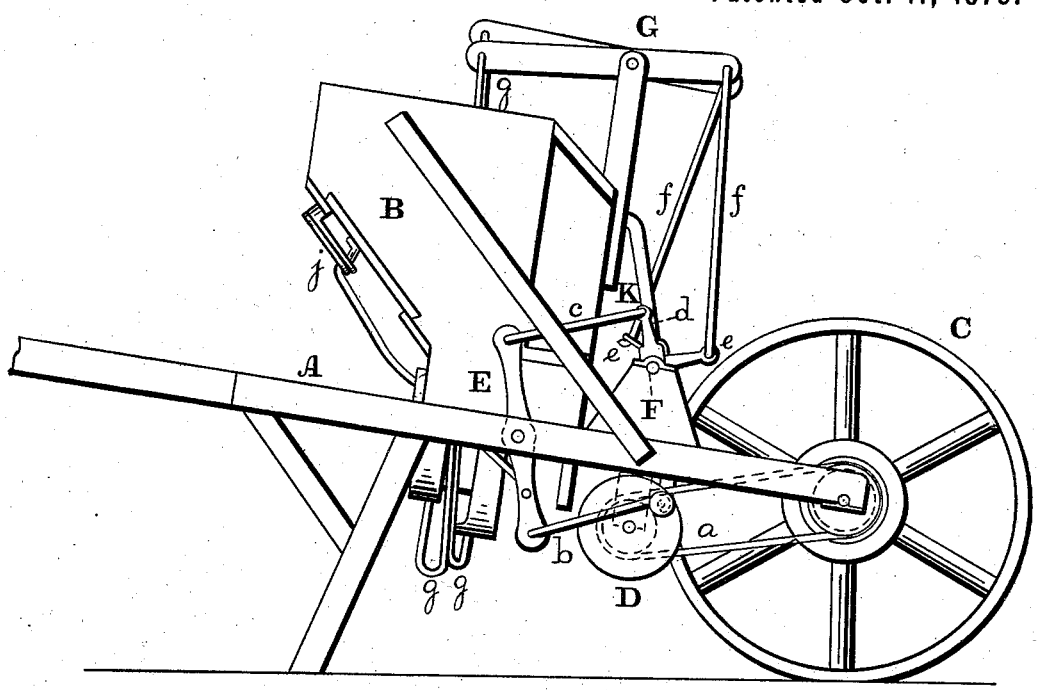
Figure 2:
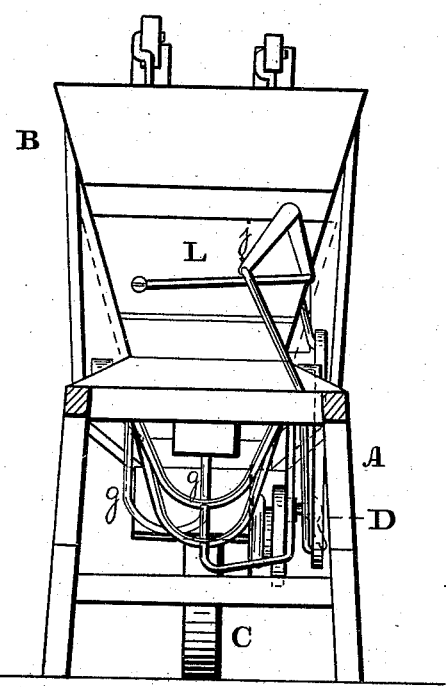
Figure 3:
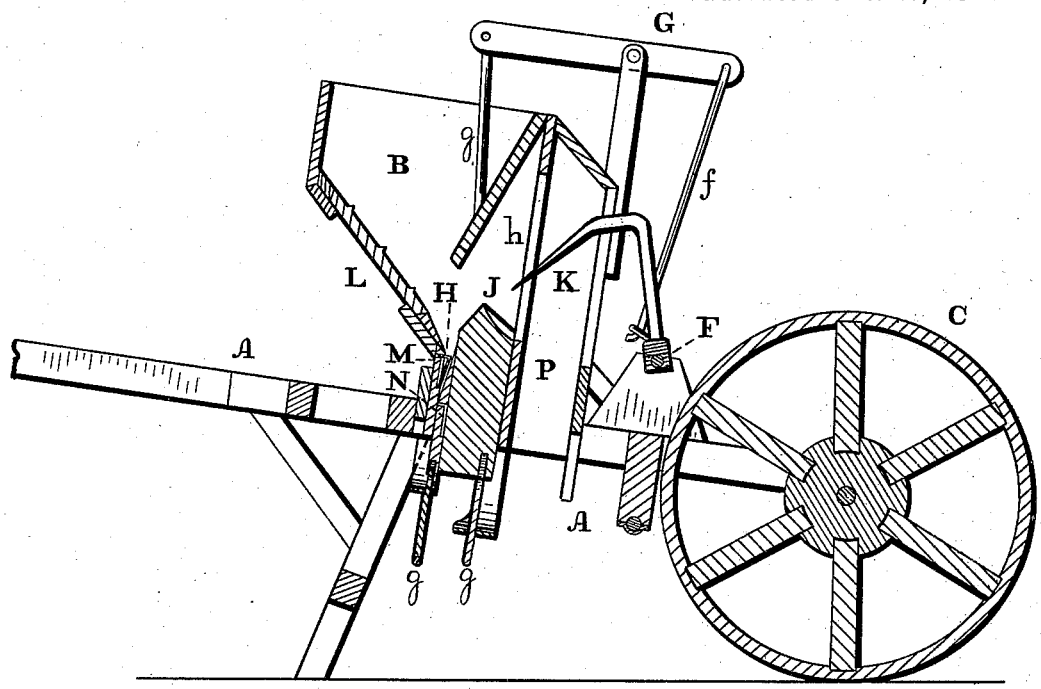
Figure 4:
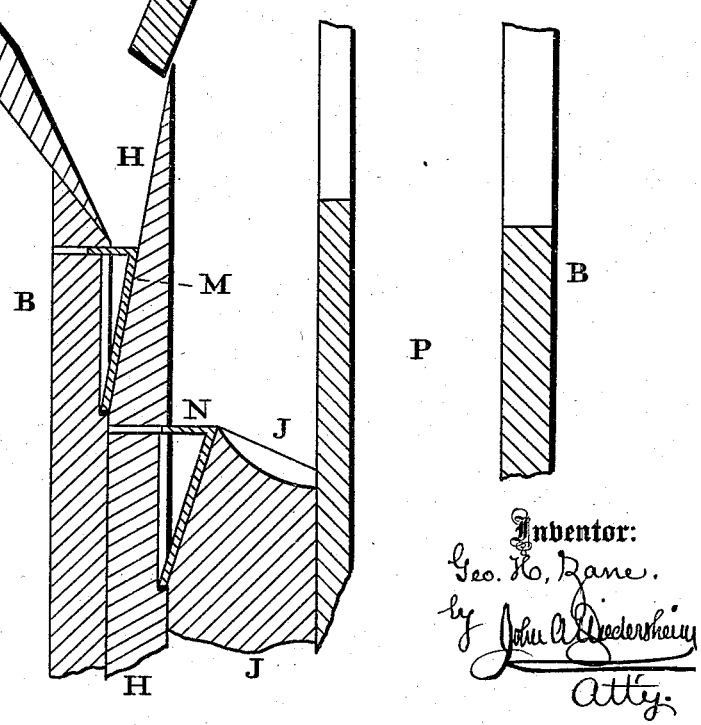

Figure 1 is a side view of the device embodying my invention. Fig. 2 is a rear view thereof. Fig. 3 is a longitudinal vertical section thereof. Fig. 4 is a sectional view of a detached portion.

Similar letters of reference indicate corresponding parts in the several figures.

My invention relates to means for systematically passing the potatoes to the dropping-conveyer; and consists in springs operating with the two slides, which distribute the potatoes from the hopper to the dropping-conveyer, so as to prevent clogging of the potatoes between the two slides, and also between the hopper and one of the slides; also, in a hopper with exit-conveyer, two slides that alternately rise and fall, and a fork which takes hold of the potato and carries it to the conveyer, forming together an improvement in potato-droppers.

Referring to the drawings, A represents the frame or truck, which supports the hopper B, and has its front end mounted on a wheel, C. D represents a crank-wheel, which is mounted on the frame A, and receives rotary motion by means of a band, *a*, passing around the hub of, or a pulley on, the wheel C. A rocking arm, E, is jointed to the frame A, and its lower end is connected by a rod, *b*, to the wrist-pin or crank of the wheel D, and its upper end is jointed to a rod, *c*, which is secured to an arm, *d*, of a transversely-arranged rock-shaft, F, whose bearings are on the frame A in front of the hopper B. Cranks or arms *e* are connected to rock-shaft, and have connected to them two rods, *f*, which extend upwardly, and are jointed, respectively, to two rocking arms or walking-beams, G, mounted on the frame A or hopper B, and extending above the hopper. To the other ends of the arms G are secured rods or connections *g*, which pass into and through the hopper, and their lower ends are connected, respectively, to two slides, H J, which are arranged within the hopper B, and have vertical sliding motions therein. The rock-shaft F has also secured to it a fork or tooth, K, which plays in a longitudinal direction in and out of a vertical slot, *h*, in the front side of the hopper B. A portion, L, of the rear side of the hopper is made to slide, and receives reciprocating motion by means of a bell-crank lever, *j*, which is connected to the rocking arm E. The slides H J alternately rise and fall, and are arranged parallel to each other. A spring, M, is secured to the inner portion of the hopper B, adjacent to the slide H, and a similar spring, N, is secured to the slide H, on the side contiguous to the slide J. These springs are of the form of an acute angle, and their bases are above, and extend at a right angle to, the line of motion of the slides. The lower ends only of the springs are fixed in position, so that the bodies of the springs may have sliding motions or play, openings being made in the hopper and slide H to receive the said bodies.

The operation is as follows: The device will be wheeled forward, thus imparting motion to the crank-wheel D, the rocking arm E, rock-shaft F, and rocking beams G, consequently to the slides H J, the fork K, and slide L, which latter serves to agitate the potatoes, and has its inner face preferably roughened or serrated to increase the agitation. When the slide H lowers, a potato will pass the top thereof, and come in line with the rising slide J, so as to be taken up thereby. At the same time the fork K approaches the potato and pierces the same. The slide H then rises and cuts off the supply of potatoes to the slide J, which now descends. The fork K, simultaneously therewith, withdraws and carries the potato to the conveyer P, which extends vertically in the hopper B, and somewhat parallel to the slides H J. As the fork withdraws, the potato is stopped against the front wall of the hopper, and thus cleared of the fork, whereby it drops through the conveyer B, and is directed to the ground. The descent of the slide H permits another potato to pass to the slide J as the latter rises; then the fork K advances, seizes said potato, carries it to the conveyer P, and clears itself thereof, as before, which operations continue as long as desired, or the supply is exhausted. When the slide H ascends it forces in the spring M; but, on the descent thereof, said spring moves out from its opening in the hopper, and covers the space between the slide and adjacent portion of the hopper, so that there will be no clogging of potatoes between the slide H and hopper. When the slide J descends it uncovers the spring N, thus permitting the latter to move out from its opening in said slide, and cover the space between the slides H J, whereby there will be no clogging of potatoes between the two slides.

The operations of the two springs M N will be more thoroughly understood on reference to Fig. 4.

Having thus described my invention, what I claim as new, and desire to secure by Letters Patent, is—

1. The slides H J, rocking arms G, rock-shaft F, and rocking arm E, combined and operating substantially as and for the purpose set forth.

2. The springs M N, in combination with the slides H J and hopper B, substantially as and for the purpose set forth.

3. The fork K, in combination with the hopper B, conveyer P, and alternately rising and falling slides H J, substantially as and for the purpose set forth.

GEO. H. ZANE.

Witnesses:
JOHN A. WIEDERSHEIM,
ALBERT H. HOECKLEY.